United States Patent
Loring et al.

(10) Patent No.: US 10,078,638 B2
(45) Date of Patent: Sep. 18, 2018

(54) SECURE HYPER TRANSFER OF LARGE FILES

(71) Applicant: GLOBALFOUNDRIES INC., Grand Cayman (KY)

(72) Inventors: Keith P. Loring, Milton, VT (US); Daniel B. Raisbeck, South Burlington, VT (US); John Paul, South Burlington, VT (US); Sean C. Davis, Fairfax, VT (US); Amit Kumar, Williston, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 226 days.

(21) Appl. No.: 15/175,767

(22) Filed: Jun. 7, 2016

(65) Prior Publication Data

US 2017/0351666 A1    Dec. 7, 2017

(51) Int. Cl.
*G06F 17/30* (2006.01)
*H04L 29/08* (2006.01)

(52) U.S. Cl.
CPC .... *G06F 17/3007* (2013.01); *G06F 17/30097* (2013.01); *H04L 67/06* (2013.01)

(58) Field of Classification Search
CPC . G06F 17/30; G06F 17/3007; G06F 17/30097
USPC ................................................. 707/600–899
See application file for complete search history.

(56) References Cited

U.S. PATENT DOCUMENTS

| 7,716,312 | B2 | 5/2010 | Gamble |
| 8,250,122 | B2 | 8/2012 | Kalle et al. |
| 2014/0164516 | A1* | 6/2014 | Maltbie .................. H04L 67/06 709/204 |

* cited by examiner

*Primary Examiner* — Isaac M Woo
(74) *Attorney, Agent, or Firm* — David Cain; Hoffman Warnick LLC (57) ABSTRACT

A system is disclosed having at least one computing device configured to send a computer file across a network by segmenting the computer file into identifiable segments and sending the segments in parallel across the network. The segmenting can be initiated while the computer file is generated. In another embodiment, a computer program product is disclosed having program code stored on a computer-readable storage medium, which when executed by at least one computing device, causes the computing device to transfer a computer file across a computer network by segmenting the computer file into identifiable segments and sending the segments in parallel across the network. The segmenting can be initiated while the computer file is generated. In another embodiment, a method of transferring a computer file across a network is disclosed, the method including segmenting the computer file into identifiable segments and sending the segments in parallel across the network.

18 Claims, 3 Drawing Sheets

SECURE HYPER TRANSFER OF LARGE FILES

FIELD

The present disclosure relates to data transfer, and more specifically, to a method and system for transferring segments of a data file in parallel.

BACKGROUND

Computer files can be transferred between computers on a network using a system such as a file transfer protocol ("FTP"), which is a standard network protocol used to transfer data files between, for example, a client and a server on a computer network. When transferring a file using FTP or another similar transfer system, the file is first generated before the file is sent. After the file is generated in its entirety, along with instructions to send, data composing the file is sent serially to a destination across the network. With a large file, the generating process, including computing and writing the file, can take a relatively large amount of time. Further, the size of the file impacts the length of time necessary to send the file. Accordingly, with a large file, total transfer times can be problematic. Adding to this negative aspect of serial transfer methods, an interruption during the generating process or the sending process can fatally halt the transfer process. The partially generated or partially sent file can be lost, requiring the transfer process to start over. For very small files, these drawbacks can be a nuisance, and these drawbacks can be increasingly problematic with increasing file sizes. For large files exceeding 10 Gb, for example, or up to 100 Gb or more, the normal transfer times alone can be very cumbersome without compounding delays caused by fatal interruptions.

BRIEF DESCRIPTION

Various embodiments of the disclosure include approaches for transferring (e.g., sending and/or receiving) a file over a network from a first computer network file system to a second computer network file system.

A first aspect of the disclosure includes a system having at least one computing device configured to send a computer file across a network from a first network file system to a second network file system by performing actions including: segmenting the computer file into identifiable segments, the segmenting being initiated while the computer file is being generated into the first network file system; and sending the segments in parallel across the network.

In some embodiments of the first aspect, the system further includes at least a second computing device configured to receive the computer file from across the network by performing actions including receiving the segments.

In some embodiments of the first aspect, the at least one computing device is configured to receive file segments from a second computing device.

In some embodiments of the first aspect, segmenting includes a first hypertransfer transactor writing transaction control data into first control files, the transaction control data indicating that the computer file exists or is being generated.

In some embodiments, the first hypertransfer transactor is configured to be invoked by a first file-generating application generating the file into the first network file system.

In some embodiments, segmenting includes a first hypertransfer controller reading first control files to determine when a file is to be sent and initiating a plurality of first hypertransfer agents, the plurality of first hypertransfer agents reading the first control files to determine segment size, each first hypertransfer agent updating the first control files to identify with a specific segment.

In some embodiments, the first hypertransfer controller is configured to read operating instruction data from a first configuration file.

In some embodiments, segmenting further includes launching the plurality of hypertransfer agents on a plurality of systems, the systems all sharing the first network file system.

In some embodiments, sending includes updating the at least one control file with file transfer progress data.

In some embodiments of the first aspect, actions further include compressing the segments and hashing the segments.

A second aspect of the disclosure includes a computer program product having program code stored on a computer-readable storage medium, which when executed by at least one computing device, causes the at least one computing device to transfer a computer file across a computer network by performing actions including: segmenting the computer file into identifiable segments, the segmenting being initiated while the computer file is generated into the first network file system; and sending the segments in parallel across the network.

In some embodiments of the second aspect, the actions further include hashing the file segments.

In some embodiments of the second aspect, the method further comprises receiving the segments at the second computer network file system, determining hash information for the segments at the second computer network file system, and verifying the segments received are the same as the segments sent by comparing the hash information for the segments at the second computer network file system with hash information determined at the first computer network file system.

In some embodiments of the second aspect, the first hypertransfer transactor is configured to be invoked by a first file-generating application generating the file into the first network file system.

In some embodiments of the second aspect, segmenting includes a first hypertransfer controller reading first control files to determine when a file is to be sent and initiating a plurality of first hypertransfer agents, the plurality of first hypertransfer agents reading the first control files to determine segment size, each first hypertransfer agent updating the first control files to identify with a specific segment.

In some embodiments, segmenting further includes launching the plurality of hypertransfer agents on a plurality of systems, the systems all sharing the first network file system.

A third aspect of the disclosure includes a method of transferring a computer file across a network, the method comprising: segmenting the computer file into identifiable segments, the segmenting being initiated while the computer file is generated into a first computer network file system; and sending the segments in parallel across the network to a second computer network file system.

In some embodiments of the third aspect, the method further comprises receiving the segments at the second computer network file system.

In some embodiments of the third aspect, the method further comprises resending segments whose hash information determined at the second computer network file system is different than the hash information determined at the first computer network file system.

In some embodiments of the third aspect, the method further comprises sending the segments to a plurality of computer network file systems simultaneously.

BRIEF DESCRIPTION OF THE FIGURES

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

As indicated above, the subject matter disclosed herein relates to data transfer, and more specifically, to securely transferring, in parallel, segments of a large data file.

As noted herein, conventional systems and methods that transfer files send data representing a file in a serial fashion, which can be overly time consuming, especially when large files are involved. In contrast to conventional approaches, various aspects of the disclosure include systems, computer program products, and associated methods for transferring a file from a first computer file system over a network of computers to a second computer file system by sending segments of the file in parallel while the file is being generated into the first computer file system. The systems, products, and methods disclosed herein can significantly shorten the transfer time of a file. The larger the file, the greater the benefit, as the transfer time can approach the time it takes to generate or to write the file to the first computer network file system, meaning a transfer completion point in time will occur after a file generation completion point in time, with the difference between the two points in time possibly nearing zero.

In the following description, reference is made to the accompanying drawings that form a part thereof, and in which is shown by way of illustration specific example embodiments in which the present teachings may be practiced. These embodiments are described in sufficient detail to enable those skilled in the art to practice the present teachings and it is to be understood that other embodiments may be utilized and that changes may be made without departing from the scope of the present teachings.

Figure 1:
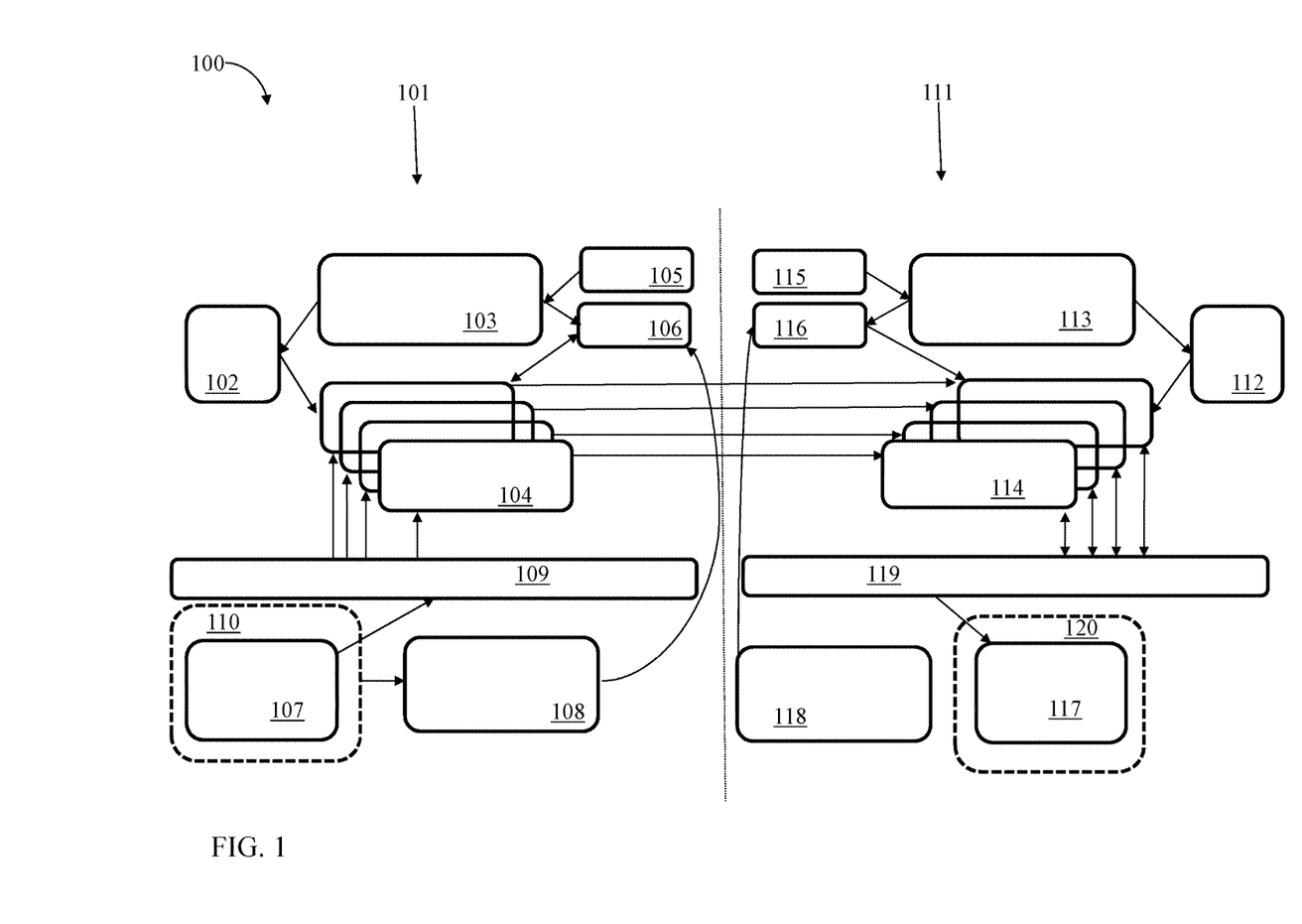
FIG. 1 shows a schematic of a file transfer system, according to various embodiments.

FIG. 1 illustrates a computer file transfer system 100 according to one embodiment. The file transfer system 100 comprises a first network file system 101, a first platform load sharing facility (LSF) cluster 102, a first hypertransfer controller 103, a plurality of first hypertransfer agents 104, a configuration file 105, a control file 106, a file-generating application 107, and a first hypertransfer transactor 108. The first hypertransfer controller 103, the plurality of first hypertransfer agents 104, and the first hypertransfer transactor 108 can be executables. The computer file transfer system 100 can also include a second computer network file system 111 that can mirror the first computer network file system 101. The second computer network file system 111 comprises a second platform LSF cluster 112, a second hypertransfer controller 113, a plurality of second hypertransfer agents 114, a second configuration file 115, a second control file 116, a second file-generating application 117, and a second hypertransfer transactor 118. Herein, the first file transfer system 100 will be described as the sending side, to send a file 109 from the first computer network file system 101 to the second computer network file system 111. The second computer network file system 111 will be described as the receiving side, to receive the file computer file 109 from the first computer network file system 101. Either side could act in either capacity, however. Further, the computer file transfer system 100 can comprise all or only some of the components shown in FIG. 1, and some of the functions of one or more components could be assumed or shared by another component.

Figure 2:
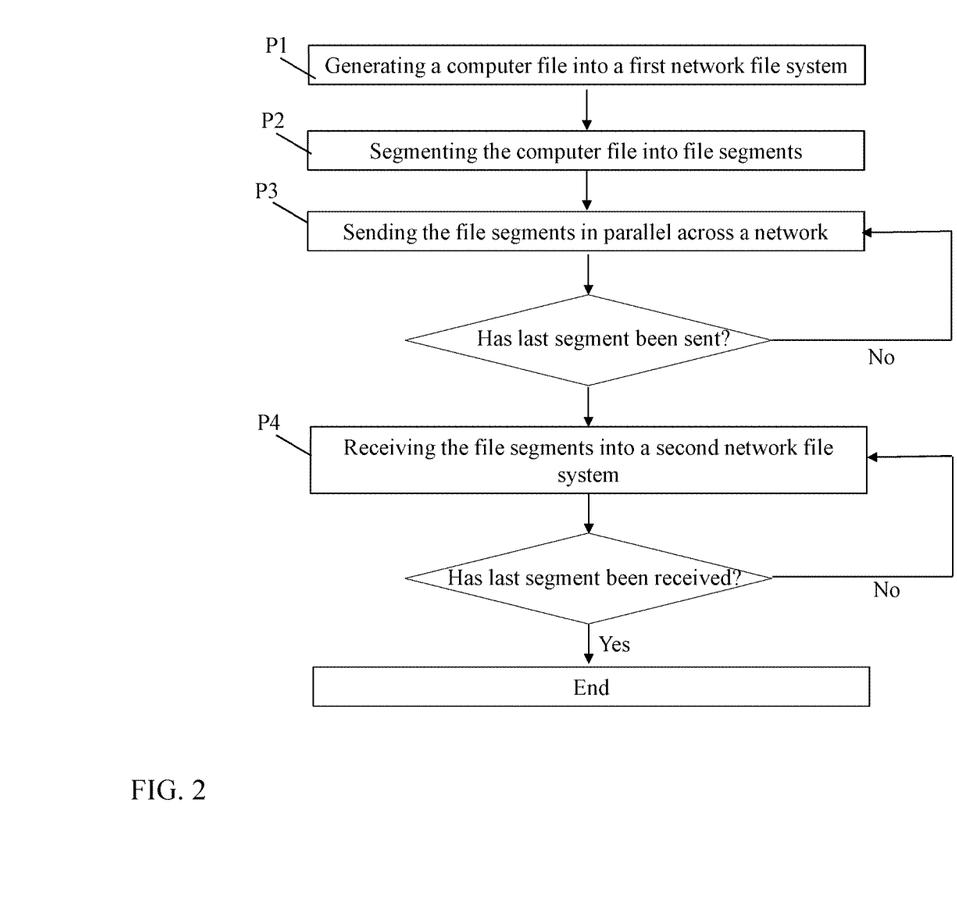
FIG. 2 shows a flow diagram illustrating a method performed according to various embodiments.

FIG. 2 shows a flow diagram illustrating processes according to various embodiments of the disclosure. The processes described with reference to FIG. 2 can be performed, for example, by the computer file transfer system 100 illustrated in FIG. 1, in order to transfer a computer file 109 from a first computer network file system across a network to a second computer network file system 111. These processes are described in conjunction with the illustrative computer file transfer system 100 of FIG. 1. Turning to FIG. 2, processes according to various embodiments can include:

Process P1: generating a computer file 109 into a first computer network file system. The computer file 109 can be any type of computer file and can be any size, though a larger-sized file generally benefits in transfer-time savings more than a smaller-sized file. The larger the file, the greater the transfer-time savings. For purposes of the discussion herein, a large file will mean a file with a size greater than 8 gigabytes.

The computer file 109 can be generated with any application capable of generating a computer file. The file-generating application 107 that generates the computer file 109 into the first computer network file system 101 can be part of the first computer network file system 101 or external to the first computer network file system 101. In one conceived embodiment, the file-generating application is an electronic design automation (EDA) software tool. EDA is a category of software tools for designing electronic systems such as printed circuit boards and integrated circuits. The tools work together in a design flow that chip designers use to design and analyze entire semiconductor chips.

Generating the computer file 109 can be initiated by the first hypertransfer transactor 108. Generating the computer file can also be initiated by the file-generating application 107. In the latter case, the file-generating application 107 can be executed to generate the computer file 109. In the case that the first hypertransfer transactor 108 initiates the generating of the computer file 109, the hypertransfer transactor 108 can be executed, or instructed, to run the file-generating application 107, which generates the computer file. The first hypertransfer transactor 108, in this case, because it runs the file-generating application 107, can beneficially know when the file is fully generated.

Process P2: segmenting the computer file into file segments. Process P2 can be initiated any time after process P1 begins, or as soon as process P2 begins, which can save an amount of time over a conventional serial method of sending, the amount of time saved being equal or very close to the amount of time it would take to generate the file. Process P2 can be initiated when the file-generating application 107 invokes the first hypertransfer transactor 108, which it can do using a wrapper, or when the first hypertransfer transactor 108 initiates the generating of the computer file 109. The first hypertransfer transactor 108 initiates process P2 by writing transaction control data into the control file 106. The control data written by the first hypertransfer transactor 108 indicates that a large file is being generated. In some cases, a file might have been previously generated, in which case, the first hypertransfer transactor 108 can be executed directly to write control data indicating that a file is ready to be sent.

The first control files 106 provide a way to communicate information between the first hypertransfer transactor 108, the first hypertransfer controller 103, and the first hypertransfer agents 104, which are responsible for segmenting the computer file 109. The first control files 106 can be a single file, a database, or a plurality of directories and/or subdirectories containing files, such as text files. The first control files 106 are located where each of the first hypertransfer transactor 108, the first hypertransfer controller 103, and the first hypertransfer agents 104 can see them (e.g., a network-based file system). The first control files 106 can comprise data regarding, e.g., sending location and address, receiving locations and addresses, file name, file size, file segment name, file segment size, file segment status (e.g., available to be sent, in-progress of sending, fully sent, requires resending), hash information, compression information, and file segment size/length. This information is written for the first time or as an update to the control files at different times by the first hypertransfer transactor 108, the first hypertransfer controller 103, and/or the first hypertransfer agents 104.

When the first hypertransfer controller 103 is launched, e.g., by a human operator, the first hypertransfer controller 103 reads the first configuration file 105. The first configuration file 105 contains data that includes details regarding how the first hypertransfer controller 103 should run. For example, the first configuration file 105 might include information regarding the port and server for particular file transfer destinations, such that when the first hypertransfer transactor 108 writes control data to the first control files 106, the first hypertransfer controller 103 can read the first configuration file 105 to determine the proper port and server where the second hypertransfer controller 113 can be reached for communication. Storing this information in the first configuration file 105 frees the first hypertransfer transactor 108 and/or other components from have to store such details.

In another example, the configuration file can provide data instructing the first hypertransfer controller 103 into what segment sizes the computer file 109 should be segmented. A user can determine the segment size or how to segment the file and enter that information into the first configuration file 105. For example, certain file types can be specified to be segmented into one segment size, while others would be segmented into another segment size. In another example, file transfer data can be stored and used to evaluate and determine optimal segment sizes for certain file types, sizes, and other criteria. In yet another example, the file segment sizes can be determined dynamically during a transfer of a computer file, based on network performance and/or system performance, on either the send or receive sides. Generally, the smaller the file segments, the more parallel the segments can be sent, and the faster the transfer can occur. Theoretically, as segment sizes are reduced in size, or at least as the last segments sent before the file is completely written are reduced in size, the transfer of those segments takes less time, and the file transfer completion point in time approaches the file generation completion time. As a matter of practicality, though, at some point, the segments might become too small and too numerous, and the resource requirements might become too great, to continue improving transfer time.

The first hypertransfer controller 103 monitors the first control files 106, reads the control data when the control data indicates a file is being generated to the first computer network file system 101, reads when there is a new transfer request, uses configuration data to determine file segment sizes, and writes additional transaction specific control data (e.g., file name, segment size, destination, etc.). The first hypertransfer controller 103 can be LSF-aware, meaning the first hypertransfer controller 103 includes code needed to interact with LSF. Based on the configuration file 105, the first hypertransfer controller 103 can generate LSF job submissions for the next steps in the file transfer process. The first hypertransfer controller 103 can generate an LSF submit command, which causes LSF to start applications on any available system, which is how the first hypertransfer controller 103 finds systems to run many instances of the first hypertransfer agents 104. Other applications such as Open Lava could also perform the functions of LSF.

The first hypertransfer agents 104 can be launched via the first LSF cluster 102. Multiple first hypertransfer agents 104 can reside on any single computer or system, and also on many computers or systems that share the first computer network file system 101. The first control files 106 are also shared on the first computer network file system 101.

The first hypertransfer agents 104 also read the control data, which can inform the first hypertransfer agents 104 that there is a computer file 109 to be transferred. In the control data, the first hypertransfer agents 104 can read information identifying file segments, and determining which file segments are sent, which are being sent, which are available to be sent, and which have encountered an error. Each first hypertransfer agent 104 can commit to send a file segment (e.g., a file segment starting at 12 Gb and ending at 13 Gb) available in queue, moving the segment from an "available" directory to a "sent" or "in progress" directory and adding a sender line identifying the responsible or committed first hypertransfer agent 104. For example, each first hypertransfer agent 104 can have a process ID number, which can be attached to the information identifying the file segment for which the respective first hypertransfer agent 104 is responsible. Identifying with a specific file segment can prevent duplication by another first hypertransfer agent 104. The first hypertransfer agents 104 can compress the segments. The first hypertransfer agents 104 can also hash the segments for later confirmation of accurate file transfer.

Process P3: sending the file segments in parallel across the network. As the computer file is segmented into segments, the segments and any corresponding hash data, are sent in parallel over a network to the second computer network file system 111. Sending the file segments in parallel reduces the time of the file transfer as compared to serial file sending methods because the total transfer time can approach the time it takes to transfer a single file segment, and a single file segment is only a fraction of the size of the entire file. After the first hypertransfer agents 104 update the first control files 106 with data indicating which file segments are to be sent, the first hypertransfer controller 103 sends the file segments. The segments can be sent by known methods, such as by using a secure file transfer protocol (SFTP), Bit Torrent, FSP, FTP, TFTP, LFTP, etc. The segments can be sent via many routes in parallel, to the second computer network file system 111. The segments can be sent to more than one location and more than one other computer network file system, as well. In one example, a single hypertransfer agent 104 per computer can run LFTP, which can send a file in parallel using a single computer, to achieve parallelism across multiple computers via hypertransfer, and within each single computer via LFTP.

The first hypertransfer agents 104 continue checking for more segments to be sent until all segments of the file 109 have been sent. The first hypertransfer agents 104 can also track the progress of transferred file segments, such as by updating the control data to represent the progress of the file transfer. In this way, if a file transfer is interrupted, the file transfer can be resumed with little or no loss of transferred data. Further, if a particular transferred file segment is received with an error or flaw, that particular file segment can be re-sent.

Depending on the configuration, a single file can be transferred to multiple receiving locations by, for example, serially sending the file from each received domain on to the next domain, sending the file multiple times from a single domain where the file is created, etc.;

Process P4: receiving the file segments at a second computer network file system. As discussed above with respect to the embodiment of FIG. 1, the second computer network file system 111 may mirror the first computer network file system 101. The first hypertransfer controller 103 regularly sends control data to the second hypertransfer controller 113. The second hypertransfer controller 113 writes control information to the second control files 116, where the second hypertransfer controller 113, the second hypertransfer agents 114, and the second hypertransfer transactor 118 can see it. The second hypertransfer controller 103 can generate an LSF submit command, which causes LSF to start multiple instances of the second hypertransfer agents 114.

The second hypertransfer agents 114 can be launched via the second LSF cluster 112. The second hypertransfer agents 114 can monitor and read the second control files 116, such that when file segments are received and written into the second control files 116, the second hypertransfer agents 114 can see the file segments, and each second hypertransfer agent 114 can commit to a particular file segment. An identifier for each second hypertransfer agent 114 can be attached to a respective file segment.

Where the first hypertransfer agents 104 compressed the segments to be sent, the second hypertransfer agents 114 can decompress the files 106 that are received at the second computer network file system 111. The control data or data packaged with each segment can indicate, for example, a standard operating system command to invoke, such as a gzip to decompress the segments.

The transferred file being large and the transfer of the file occurring in many pieces both increase the chance of data being lost or miscommunicated during file transfer. To reduce this chance, the second hypertransfer agents 114 can verify the content of each segment. Where the first hypertransfer agents 104 added hash content for each segment to the first control files 106, that hash information can be received along with each segment to the second computer network file system 111, and the second hypertransfer agents 114 can re-hash the segments and verify that the newly determined hash information is the same as the hash information received. When the hash information is not the same for any particular segment, that particular segment can be re-sent. The segment verification can be performed as the segments are received.

Further, because the transfer is ongoing while the file 109 is generated, and a file-generating application could rewrite sections, the file-generating application 107 might rewrite a segment after the segment is sent, received, and verified. Accordingly, the second hypertransfer agents 114 can re-hash the segments after the final segment is received, to verify that no segments were rewritten after being sent. The hypertransfer agents 114 can read from the second control files 116 when the last segment is received, which is data communicated from the first hypertransfer transactor 108 to the first control files 106 to the first hypertransfer agents 104 to the second control files 116.

To hash the segments, the second hypertransfer agents 114 can read from either the control data or data packaged with each received segment (packaged, e.g., by the first hypertransfer agents). The control data or data packaged with each segment can indicate, for example, a standard operating system command to invoke, such as a "shalsum" to verify the content. The second hypertransfer controller 113 can update the first hypertransfer controller 103 regarding the status of events and the conditions on the receiving side. For example, the second hypertransfer controller 113 can update the first hypertransfer controller 103 regarding any segments that need to be re-sent.

Because compression and verification are segmented, these tasks benefit from the same parallelization as the secure file transfer. A segment on the sending side can be modified by the application generating the file after the segment is transferred to the receiving side, and these segments can be resent. Likewise, segments that fail verification on the receiving side (at the second computer network file system 111) can be resent.

The second hypertransfer agents 114 can update the second control files 116 regarding each segment's status. For example, when a file segment is completely sent, a second hypertransfer agent 114 can move the file segment to a directory for completely received file segments. To limit extra resources and time regenerating the file segments and/or the computer file more than necessary, the second hypertransfer agents 114 can arrange the completed file segments to assemble the computer file 119 in a desired final destination. The second hypertransfer agents 114 can continue this process until all the file segments have been received, and the file 119 is complete and verified in the second computer network file system 111. The second hypertransfer transactor 118 could instead assemble the file segments into the computer file 119. In either case, the second hypertransfer transactor 118 can send a notification, such as an email or other message, to a user to notify the user. when the file 119 is complete.

As discussed above, because the segmenting of the file into segments begins as early as the start of file generation, and the segmenting of the file and sending of the file segments continues as the file is generated, and because the file segments are sent in parallel, the file 109 can be fully sent by the first computer network file system 101 practically as soon as the last bit of data in the file 109 is generated, and the file 109 can be fully received by the second computer network file system 111 thereafter by only the additional time it takes for the last segment to transmit to the second computer network file system 111. As compared to conventional methods that require the entire file to be generated before sending, the total generation plus transfer time can be reduced by approximately the difference in time between transferring the whole file serially and transferring just a last segment of the file. With very large files, transferring the last segment can be a trivial amount of time compared to the time it takes to serially transfer the whole file.

It is understood that in the flow diagram shown and described herein, other processes may be performed while not being shown, and the order of processes can be rearranged according to various embodiments. Additionally, intermediate processes may be performed between one or more described processes. The flow of processes shown and described herein is not to be construed as limiting of the various embodiments.

Figure 3:
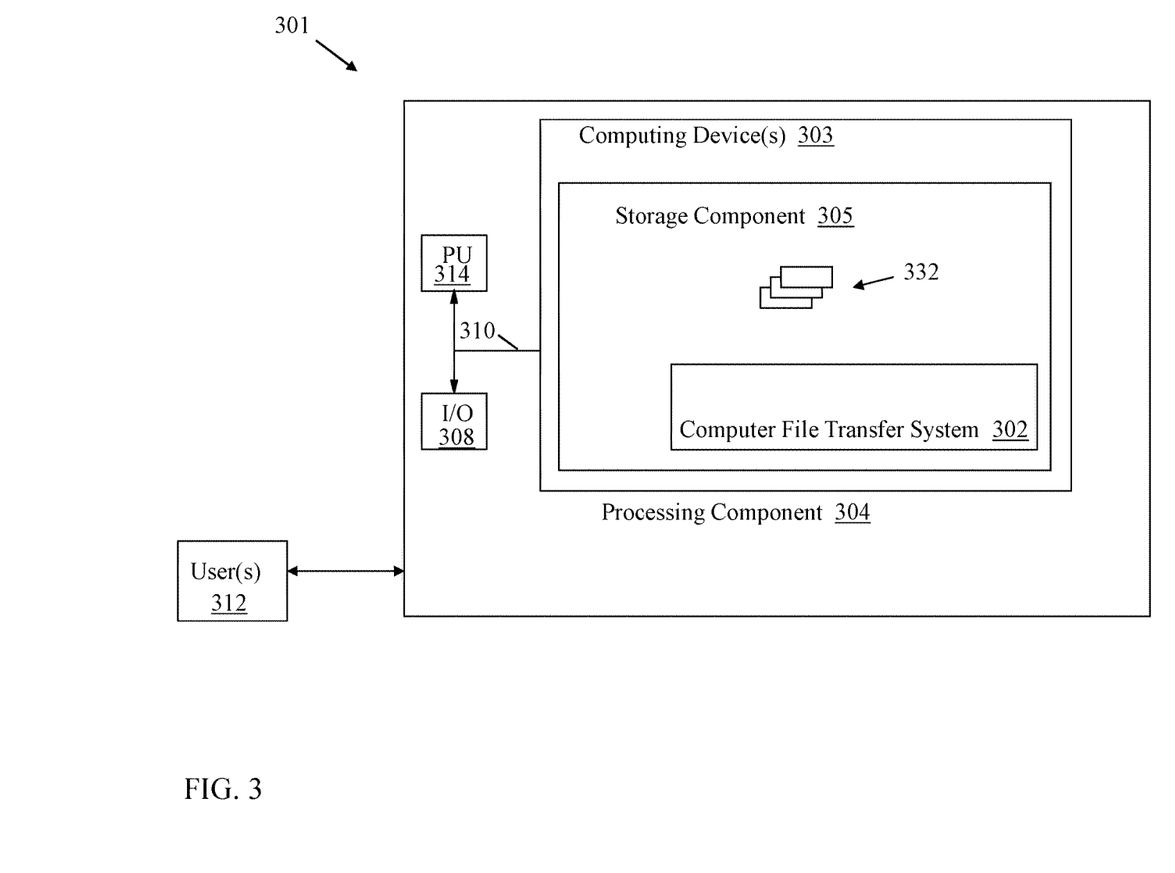
FIG. 3 shows an environment including a system for transferring a file across a network from a first computer network file system to a second computer network file system, according to various embodiments of the disclosure.

FIG. 3 shows an illustrative environment including a file transfer system 302 for performing the functions described herein according to various embodiments of the invention. To this extent, the environment includes a computer system 301 that can perform one or more processes described herein in order to transfer a file from a first computer network file system over a network to a second computer network file system. In particular, the computer system 301 is shown as including the file transfer system 302, which makes the computer system operable to send a file over a network from a first computer network file system to a second computer network file system, and/or to receive a file over a network from a first computer network file system to a second computer network file system by performing any/all of the processes described herein and implementing any/all of the embodiments described herein. The file transfer system 302 can include any one or more of the features described with respect to FIG. 1 that are sufficient to enable the computer system 301 to send a file over a network from a first computer network file system to a second computer network file system, by performing any/all of the processes described herein and implementing any/all of the embodiments described herein.

The computer system 301 is shown including a computing device 303, which can include a processing component 304 (e.g., one or more processors), a storage component 305 (e.g., a storage hierarchy), an input/output (I/O) component 308 (e.g., one or more I/O interfaces and/or devices), and a communications pathway 310. In general, the processing component 304 executes program code, such as the file transfer system 302, which is at least partially fixed in the storage component 305. While executing program code, the processing component 304 can process data, which can result in reading and/or writing transformed data from/to the storage component 305 and/or the I/O component 108 for further processing. The pathway 110 provides a communications link between each of the components in the computer system 301. The I/O component 108 can comprise one or more human I/O devices, which enable a user (e.g., a human and/or computerized user) 312 to interact with the computer system 102 and/or one or more communications devices to enable the system user 312 to communicate with the computer system 301 using any type of communications link. To this extent, the computer file transfer system 302 can manage a set of interfaces (e.g., graphical user interface(s), application program interface, etc.) that enable human and/or system users 312 to interact with the computer file transfer system 302.

The computer system 102 can comprise one or more general purpose computing articles of manufacture (e.g., computing devices) capable of executing program code, such as the computer file transfer system 302, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the computer file transfer system 302 can be embodied as any combination of system software and/or application software. It is further understood that the computer file transfer system 302 can be implemented in a cloud-based computing environment, where one or more processes are performed at distinct computing devices (e.g., a plurality of computing devices 303), where one or more of those distinct computing devices may contain only some of the components shown and described with respect to the computing device 303 of FIG. 3.

Further, the computer file transfer system 302 can be implemented using a set of modules 332. In this case, a module 332 can enable the computer system 301 to perform a set of tasks used by the computer file transfer system 302, and can be separately developed and/or implemented apart from other portions of the computer file transfer system 302. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 305 of a computer system 301 that includes a processing component 304, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 301.

When the computer system 301 comprises multiple computing devices, each computing device may have only a portion of computer file transfer system 302 fixed thereon (e.g., one or more modules 132). However, it is understood that the computer system 301 and computer file transfer system 302 are only representative of various possible equivalent computer systems that may perform a process described herein. To this extent, in other embodiments, the functionality provided by the computer system 301 and computer file transfer system 302 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 301 includes multiple computing devices 303, the computing devices can communicate over any type of communications link. Further, while performing a process described herein, the computer system 301 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

While shown and described herein as a method and system for transferring a file across a network from a first computer network file system to a second computer network file system, it is understood that aspects of the invention further provide various alternative embodiments. For example, in one embodiment, the invention provides a computer program fixed in at least one computer-readable medium, which when executed, enables a computer system to transfer a file across a network from a first computer network file system to a second computer network file system. To this extent, the computer-readable medium includes program code, such as the computer file transfer system 302 (FIG. 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In any case, the technical effect of the various embodiments of the invention, including, e.g., the computer file transfer system 302, is to transfer a file across a network from a first computer network file system to a second computer network file system in parallel. It is understood that according to various embodiments, the computer file transfer system 302 could be implemented to transfer a file across a network from a first computer network file system to a second computer network file system, as described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A system comprising:
    at least one computing device configured to send a computer file across a network from a first network file system to a second network file system by performing actions including:
        segmenting the computer file into identifiable segments, the segmenting being initiated while the computer file is being generated into the first network file system; and
        sending the segments in parallel across the network,
        wherein segmenting is performed by a first hypertransfer transactor writing transaction control data into first control files, the transaction control data indicating that the computer file exists or is being generated and wherein the segmenting is initiated in response to invoking the first hypertransfer transactor or in response to the first hypertransfer transactor generating the computer file.

2. The system of claim 1, wherein the system further comprises:
    at least a second computing device configured to receive the computer file from across the network by performing actions including:
        receiving the segments.

3. The system of claim 2, wherein receiving the segments at the at least a second computing device further comprises:
    determining hash information for the segments at the second computer network file system; and
    verifying the segments received are the same as the segments sent by comparing the hash information for the segments at the second computer network file system with hash information determined at the first computer network file system.

4. The system of claim 3, wherein as a result of verifying revealing that hash information for any particular segment at the second computer network file system is not the same as hash information for that particular segment at the first computer network file system, the particular segment is re-sent.

5. The system of claim 1, wherein the at least one computing device is configured to receive file segments from a second computing device.

6. The system of claim 1, wherein the first hypertransfer transactor is configured to be invoked by a first file-generating application generating the file into the first network file system.

7. The system of claim 1, wherein segmenting includes a first hypertransfer controller reading the first control files to determine when the file is to be sent.

8. The system of claim 7, wherein segmenting includes the first hypertransfer controller initiating a plurality of first hypertransfer agents, the plurality of first hypertransfer agents reading the first control files to determine segment size, each first hypertransfer agent updating the first control files to identify with a specific segment.

9. The system of claim 8, wherein the first hypertransfer controller is configured to read operating instruction data from a first configuration file.

10. The system of claim 8, wherein segmenting further includes launching the plurality of hypertransfer agents on a plurality of other systems, the systems all sharing the first network file system.

11. The system of claim 8, wherein sending includes updating the at least one control file with file transfer progress data.

12. A computer program product comprising program code stored on a non-transitory computer-readable medium, which when executed by at least one computing device, causes the at least one computing device to transfer a computer file across a computer network by performing actions including:
- segmenting the computer file into identifiable segments, the segmenting being initiated while the computer file is generated into the first network file system; and
- sending the segments in parallel across the network,
- wherein segmenting includes a first hypertransfer transactor writing transaction control data into first control files, the transaction control data indicating that the computer file exists or is being generated, and wherein segmenting further includes a first hypertransfer controller reading first control files to determine when a file is to be sent and initiating a plurality of first hypertransfer agents, the plurality of first hypertransfer agents reading the first control files to determine segment size, each first hypertransfer agent updating the first control files to identify with a specific segment.

13. The computer program product of claim 12, wherein the actions further include hashing the file segments.

14. The computer program product of claim 12, wherein the first hypertransfer transactor is configured to be invoked by a first file-generating application generating the file into the first network file system.

15. The computer program product of claim 12, wherein segmenting further includes launching the plurality of hypertransfer agents on a plurality of systems, the systems all sharing the first network file system.

16. A method of transferring a computer file across a network, the computer file being segmented into identifiable segments while the computer file is generated into a first computer network file system, wherein the segmenting includes a first hypertransfer transactor writing transaction control data into first control files, the transaction control data indicating that the computer file exists or is being generated, the method comprising:
- receiving the segments, sent in parallel across the network, at a second computer network file system,
- determining hash information for the segments at the second computer network file system; and
- verifying the segments received are the same as the segments sent by comparing the hash information for the segments at the second computer network file system with hash information determined at the first computer network file system.

17. The method of claim 16, wherein the method further comprises:
- segmenting the computer file into identifiable segments;
- sending the segments in parallel across the network to the second computer network file system; and
- resending segments whose hash information determined at the second computer network file system is different than the hash information determined at the first computer network file system.

18. The method of claim 17, wherein the method further comprises sending the segments to a plurality of computer network file systems simultaneously.

\* \* \* \* \*